United States Patent [19]

Lyman

[11] 4,436,705

[45] Mar. 13, 1984

[54] EXTRACTING CHROMIUM (III) FROM AQUEOUS SOLUTIONS WITH 2-ETHYLHEXYL ACID PHOSPHATE

[75] Inventor: Dale E. Lyman, Bumpass, Va.

[73] Assignee: Mobil Oil Corporation, New York, N.Y.

[21] Appl. No.: 518,994

[22] Filed: Aug. 1, 1983

[51] Int. Cl.$^3$ ............................................. C01G 37/00
[52] U.S. Cl. ................................. 423/54; 75/101 BE
[58] Field of Search ...................... 423/54; 75/101 BE

[56] References Cited

U.S. PATENT DOCUMENTS

| | | | |
|---|---|---|---|
| 4,016,054 | 4/1977 | Gandon et al. | 423/54 |
| 4,082,832 | 4/1978 | Watanabe et al. | 423/54 |
| 4,226,791 | 10/1980 | Reinhardt et al. | 423/54 |
| 4,230,677 | 10/1980 | Kagetsu et al. | 423/54 |
| 4,269,705 | 5/1981 | Yoshioka et al. | 423/54 |

FOREIGN PATENT DOCUMENTS

| | | | |
|---|---|---|---|
| 2716815 | 10/1977 | Fed. Rep. of Germany | 423/54 |
| 2001042 | 1/1979 | United Kingdom | 423/54 |

*Primary Examiner*—Herbert T. Carter
*Attorney, Agent, or Firm*—Alexander J. McKillop; Michael G. Gilman; Lawrence O. Miller

[57] ABSTRACT

This invention concerns a process for extracting chromium (III) from an aqueous solution containing chromium (III) with an extractant comprising a mixture of mono-2-ethylhexyl phosphoric acid and di-2-ethylhexyl phosphoric acid. An organic solvent such as a low aromatic kerosene is employed in this invention for dilution and dissolution of the extractant. Aqueous acid waste streams containing chromium (III) can be reduced to a chromium (III) concentration of 80 ppm thereby enabling the stream to be reclaimed.

10 Claims, 2 Drawing Figures

4,436,705

EXTRACTING CHROMIUM (III) FROM AQUEOUS SOLUTIONS WITH 2-ETHYLHEXYL ACID PHOSPHATE

BACKGROUND OF THE INVENTION

1. Field of the Invention

The present invention relates to a method for extracting chromium (III) from aqueous solutions containing chromium (III) using a mixture of mono-2-ethylhexyl phosphoric acid and di-2-ethylhexyl phosphoric acid as the extractant.

2. Description of the Prior Art

The extraction of chromium (III) from waste metallurgy process liquor containing chromium (III) such as aqueous sulfuric acid streams is necessary to enable the acid stream to be reclaimed or safely disposed of without pollution.

Reduction of chromium (III) in effluent acid streams requires precipitation by adjusting the pH of the stream to 7.0. Chromium (III) is removed by filtration resulting in a solids waste disposal liability. Also, the post-filtered acid stream has been neutralized having no recycle value. The process requires expensive neutralization chemicals and results in no beneficial/recyclable effluent.

SUMMARY OF THE INVENTION

The present invention provides a process for the extraction of chromium (III) from an aqueous chromium (III)-bearing solution comprising contacting said solution with an organic extraction solvent comprising a mixture of mono-2-ethylhexyl phosphoric acid and di-2-ethylhexyl phosphoric acid as extractant whereby chromium (III) is extracted from the aqueous solution into the organic phase and subsequently separating the resultant chromium (III) loaded organic phase from the aqueous phase.

DESCRIPTION OF THE PREFERRED EMBODIMENTS

Figure 1:
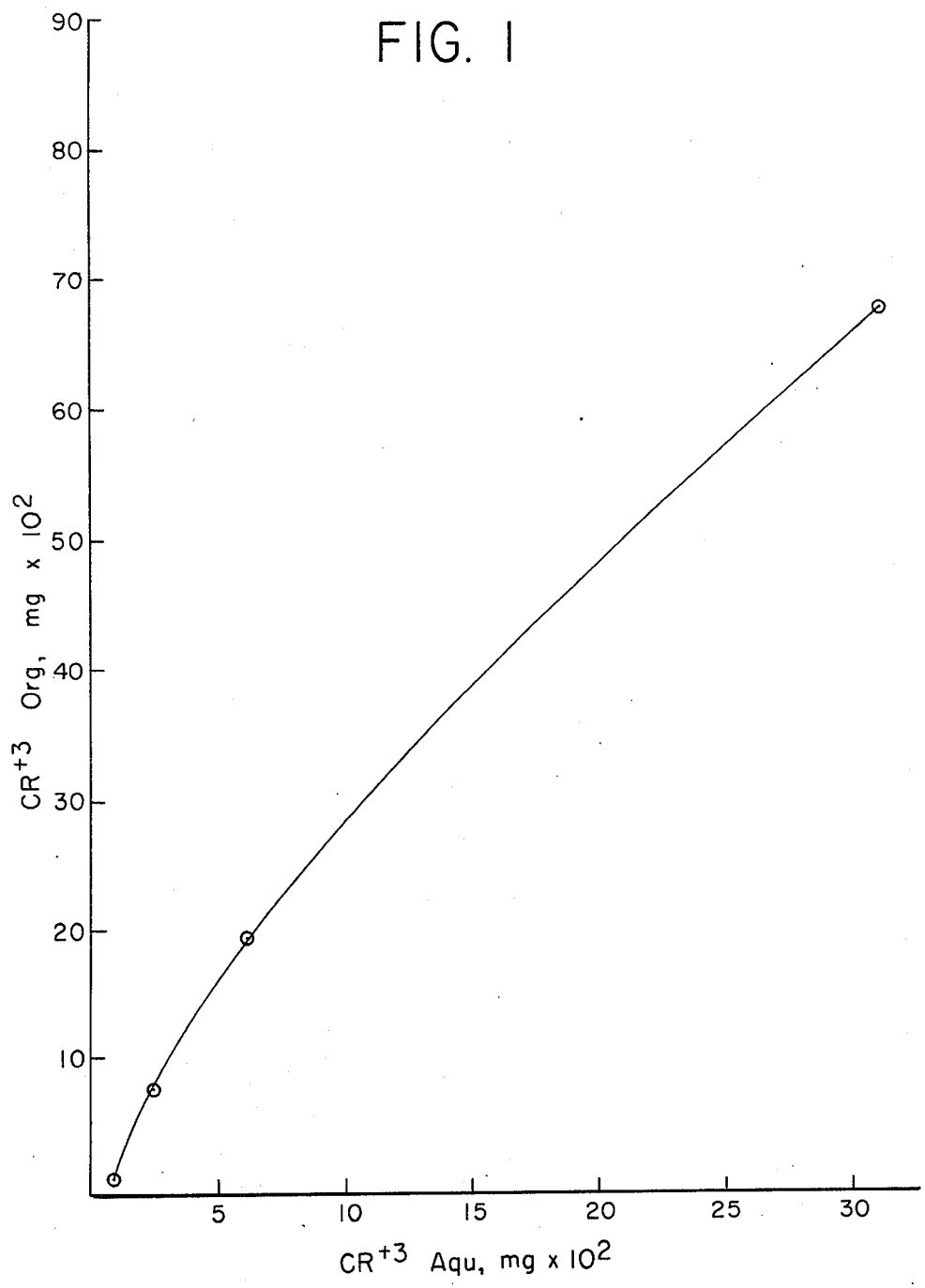
FIG. 1 shows the distribution of chromium (III) in the aqueous phase and the organic phase after extraction.

This invention relates to a process for extracting chromium (III) from aqueous solutions, particularly waste aqueous acid liquors, wherein a mixture of mono-2-ethylhexyl phosphoric acid and di-2-ethylhexyl phosphoric acid is used as the extractant. The amount of mono-2-ethylhexyl phosphoric acid is within the range of 0.1 to 10 molar equivalents of the diester.

Aqueous solutions containing chromium (III) are obtained as waste liquors from processes such as electroplating, etching, etc. Removal of the chromium (III) values from a concentration of about 165 to 80 ppm enables the waste liquor to be reclaimed.

In carrying out the process of the present invention, the chromium (III)-bearing aqueous solution, is contacted either by batch, continuously co-current or continuously counter-current, with the extractant solvent. Packed column, pulse column, rotating disc column, etc. are preferably used in the countercurrent extraction with multiple stages, but any well-known contact equipment generally used for the solvent extraction is available for this invention.

The volume ratio of the organic phase to the water phase which are in contact with each other may be varied over a considerable range. The most effective ratio is dependent on the concentration of the extractant, the organic diluent, and the aqueous solution containing chromium (III), and on the method of mixing these liquids, such as the type of the equipment. In general, this ratio is adjusted so that the amount of chromium (III) in the aqueous phase is reduced to about 80 ppm. Aqueous to organic ratio of from 10:1 to 1:10 are believed to be effective, although other ratios are believed to be effective, depending upon the specific separation.

An organic solvent is employed in this invention for dilution and dissolution of the above-mentioned extractant. The amount of extractant dissolved in the diluent is generally 5.0 to 50.0 volume percent and preferably 10.0 to 20.0 percent. The solvent should be also to dissolve the extractant to form an organic phase and a water phase at rest at least after the liquid-liquid contact from the chromium (III) water phase into the solvent phase. It should also be insoluble in water, and should not inhibit the function of the extraction of chromium (III) from the solution containing chromium (III). Effective solvents are distillates of petroleum such as low aromatic kerosene, naphtha and toluene.

After the extraction of chromium (III) into the organic phase and the separation of the water phase and the organic phase, the chromium (III) loaded organic phase may be scrubbed to remove the chromium (III), thereby enabling the stripped chromium (III)-free solvent to be recycled to the extraction circuit for treatment of incoming chromium (III)-bearing solutions. This may be achieved by contacting the loaded solvent with an alkaline or acid solution.

EXAMPLES

This invention is further illustrated by referring to the following examples based on laboratory tests which are offered only as an illustrative embodiment of the invention and is not intended to be limited or restrictive thereof.

Equal molar equivalents of mono-2-ethylhexyl phosphoric acid and di-2-ethylhexyl phosphoric acid extractant was dissolved in a low aromatic kerosene (Certrex 39) to obtain a concentration of 10 percent by volume extractant. The organic solvent thus prepared was brought into contact with a 5 percent by weight sulfuric acid solution containing chromium (III). The ratio of volume of the aqueous phase to that of the organic phase was 1:1. The contact was carried out by mixing the organic solvent and the chromium (III)-bearing aqueous solution in a separatory funnel for one minute. The emulsion was allowed to separate into two phases (approximately 10 minutes). The aqueous phase was analyzed by atomic absorption to determine net chromium extracted into the organic solvent. The results obtained are shown in Table 1.

TABLE I

| Chromium (III) Concentration ppm, Aqu. | | |
|---|---|---|
| Initial | Final | Percent Extracted |
| 165 | 80 | 51.5 |
| 250 | 125 | 50.0 |
| 1,000 | 250 | 75.0 |

TABLE I-continued

| Chromium (III) Concentration ppm, Aqu. | | |
|---|---|---|
| Initial | Final | Percent Extracted |
| 2,500 | 616 | 75.4 |
| 10,000 | 3,100 | 69.0 |

FIG. 1 illustrates the distribution of chromium (III) in the aqueous and organic phases. As the initial chromium (III) concentration in the aqueous phase increases, the amount of chromium (III) extracted into the organic phase increases.

Figure 2:
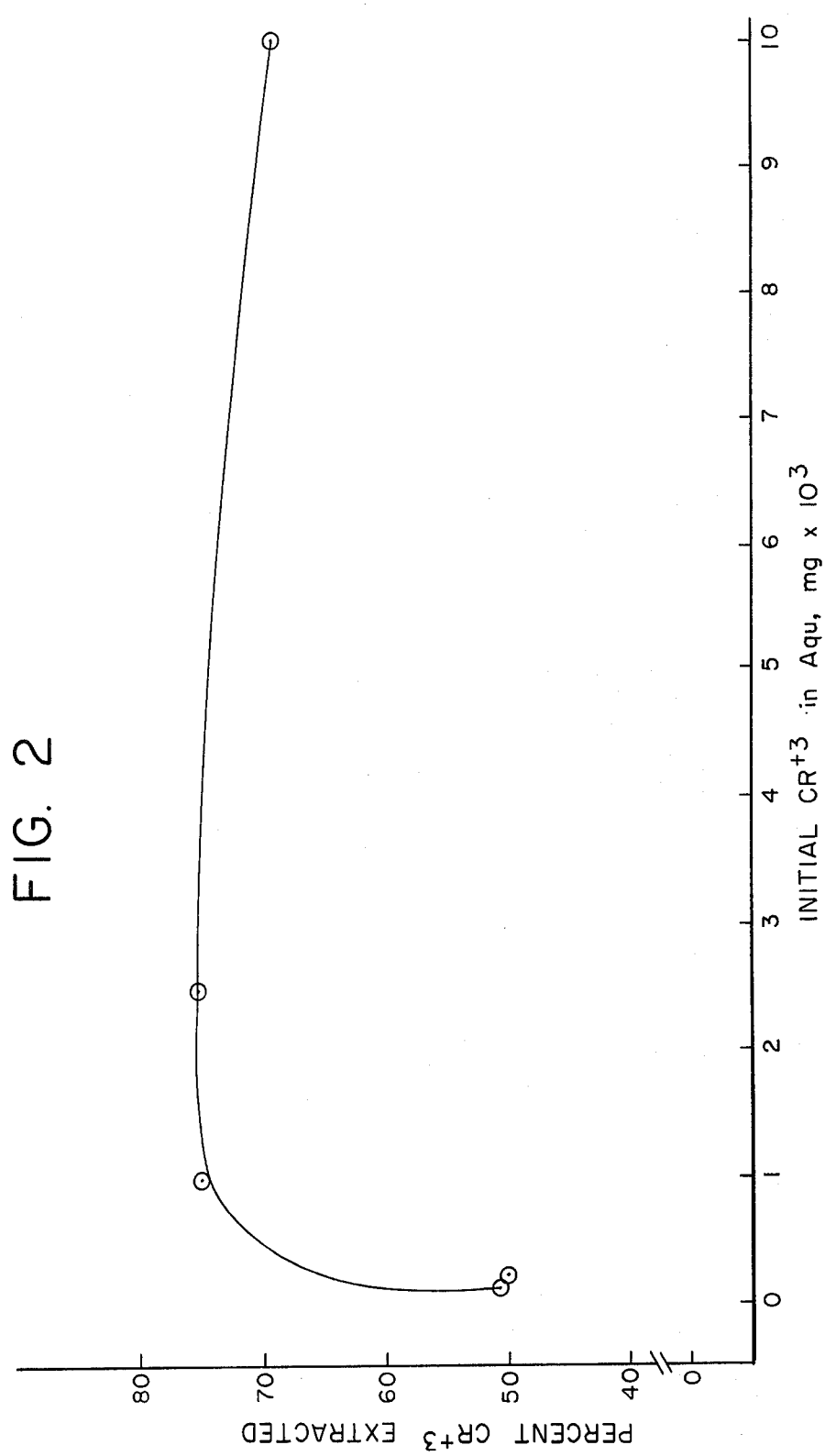
FIG. 2 illustrates the extraction coefficient as the concentration of chromium (III) in the aqueous phase increases.

FIG. 2 illustrates the extraction coefficient as the concentration of chromium (III) increase in the aqueous phase. The loading of chromium (III) in the organic phase is not proportional to the increase in the aqueous phase.

What is claimed is:

1. A process for the extraction of chromium (III) from an aqueous chromium (III)-bearing solution comprising:
   (a) contacting said solution with an organic extraction solvent comprising a mixture of mono-2-ethylhexyl phosphoric acid and di-2-ethylhexyl phosphoric acid as extractant whereby chromium (III) is extracted from the aqueous solution into the organic phase; and
   (b) subsequently separating the resultant chromium (III) loaded organic phase from the aqueous phase.

2. The process of claim 1 wherein from about 0.1 to 10 parts by volume of the aqueous solution are employed per part by volume of the extraction solvent.

3. The process of claim 1 wherein the said extractant further comprises an organic diluent.

4. The process of claim 3 wherein the amount of extractant in the organic diluent is within the range of 5.0 to 50.0 volume percent.

5. The process of claim 3 wherein the diluent is a petroleum distillate.

6. The process of claim 5 wherein the petroleum distillate is a low aromatic kerosene.

7. The process of claim 5 wherein the petroleum distillate is naphtha.

8. The process of claim 5 wherein the petroleum distillate is toluene.

9. The process of claim 1 wherein the aqueous chromium (III)-bearing solution consists essentially of a spent acid solution.

10. The process of claim 1 wherein the ratio of mono-2-ethylhexyl phosphoric acid to di-2-ethylhexyl phosphoric acid is within the range of about 0.1 to 10 molar equivalents.

* * * * *